(12) United States Patent
Huang et al.

(10) Patent No.: US 8,460,829 B1
(45) Date of Patent: Jun. 11, 2013

(54) POROUS POLYMER SEPARATOR LAYER HAVING A NON-UNIFORM CROSS-SECTIONAL THICKNESS FOR USE IN A SECONDARY LIQUID-ELECTROLYTE BATTERY

(75) Inventors: Xiaosong Huang, Novi, MI (US); Hamid G. Kia, Bloomfield Hills, MI (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/473,750

(22) Filed: May 17, 2012

(51) Int. Cl.
*H01M 2/18* (2006.01)
(52) U.S. Cl.
USPC .......................... 429/246; 429/247; 429/254
(58) Field of Classification Search
None
See application file for complete search history.

(56) References Cited

U.S. PATENT DOCUMENTS

| | | | | |
|---|---|---|---|---|
| 5,240,655 | A * | 8/1993 | Troffkin et al. | 264/28 |
| 5,948,557 | A * | 9/1999 | Ondeck et al. | 429/508 |
| 6,096,213 | A * | 8/2000 | Radovanovic et al. | 210/500.36 |
| 6,232,007 | B1 * | 5/2001 | Payne et al. | 429/403 |
| 2006/0204839 | A1 * | 9/2006 | Richards et al. | 429/137 |
| 2008/0269366 | A1 * | 10/2008 | Shaffer et al. | 521/134 |
| 2009/0155678 | A1 * | 6/2009 | Less et al. | 429/246 |
| 2009/0269656 | A1 * | 10/2009 | Takita et al. | 429/145 |
| 2009/0311607 | A1 * | 12/2009 | Han et al. | 429/246 |
| 2011/0059368 | A1 * | 3/2011 | Inagaki et al. | 429/246 |
| 2012/0156568 | A1 | 6/2012 | Kia et al. | |
| 2012/0156569 | A1 | 6/2012 | Kia et al. | |

OTHER PUBLICATIONS

U.S. Appl. No. 13/149,205; Title: Methods of Making Lithium Ion Battery Separators; filed May 31, 2011; First Named Inventor: Xiaosong Huang.
U.S. Appl. No. 13/299,480; Title: Making a Lithium Ion Battery Separator; filed Nov. 18, 2011; First Named Inventor: Xiaosong Huang.
U.S. Appl. No. 13/473,863; Title: Porous Polymer Separator Layer Having a Non-Uniform Cross-Sectional Thickness for Use in a Secondary Liquid-Electrolyte Battery; filed May 17, 2012; First Named Inventor: Xiaosong Huang.

* cited by examiner

*Primary Examiner* — Patrick Ryan
*Assistant Examiner* — Jose Colucci Rios
(74) *Attorney, Agent, or Firm* — Reising Ethington P.C.

(57) ABSTRACT

A porous polymer separator layer that exhibits a non-uniform cross-sectional thickness and a method of making the same are disclosed. The porous polymer separator layer may be made by a process that involves forming a film having a non-uniform cross-sectional thickness similar to that sought to be imparted to the resultant separator layer and deriving the porous polymer separator layer from the film. An electrochemical battery cell for a secondary liquid-electrolyte battery may incorporate the disclosed porous polymer separator layer between a negative electrode and a positive electrode in a way that helps maintain a more evenly distributed current density within the cell.

20 Claims, 4 Drawing Sheets

POROUS POLYMER SEPARATOR LAYER HAVING A NON-UNIFORM CROSS-SECTIONAL THICKNESS FOR USE IN A SECONDARY LIQUID-ELECTROLYTE BATTERY

TECHNICAL FIELD

The technical field of this disclosure relates generally to separators for use in secondary liquid-electrolyte batteries and, more specifically, to a porous polymer separator layer having a non-uniform cross-sectional thickness.

BACKGROUND

A secondary liquid-electrolyte battery generally contains at least one electrochemical battery cell that include a negative electrode, a positive electrode, and a separator situated between the electrodes. The negative and positive electrodes are constructed from materials that can participate in both oxidation and reduction reactions. Such materials allow an electric current to be reversibly passed between the electrodes, external to the separator, while an ionic species migrates through the separator within a liquid electrolyte to electrochemically balance the current flow. This type of electrical and ionic current flow occurs spontaneously (cell discharge phase in which oxidation occurs at the negative electrode and reduction occurs at the positive electrode) or is compelled (cell charge phase in which oxidation occurs at the positive electrode and reduction occurs at the negative electrode). The electric current generated during cell discharge may be used to power, at least in part, an electrical load while an applied voltage from an external power source may be used to charge, or re-power, the cell once its current capacity has fallen to an undesirable level.

The separator facilitates operation of the electrochemical battery cell by providing a porous and electrically-insulative mechanical support barrier between the two electrodes. The separator, in general, has a porosity sufficient to contain the liquid electrolyte—which can communicate the ionic species—yet is thermally, chemically, and mechanically stable enough to separate the negative and positive electrodes over the course of many discharge/charge cell cycles so that a short-circuit is prevented. A wide variety of materials, either alone or in combination with one another, have been either utilized or investigated for construction of the separator with the goal of imparting long term operational reliability to the separator within different working environments. The most commonly used separators today are made from a single flat polyolefin sheet membrane or a laminate of several flat polyolefin sheet membranes. The particular polyolefins usually employed are those derived from simple low-carbon number olefins, such as polypropylene and polyethylene.

The electrochemical battery cell, in order to interact with the electrical load and the external power source, is configured for connection to an external circuit that provides an electric current path between the negative and positive electrodes around the separator. Each of the negative and positive electrodes, for instance, is typically associated with a metallic current collector that helps distribute the electric current passing through the external circuit to and from all electrochemically active regions of the electrodes. A connection feature such as connector tab may be included on each of the metallic current collectors. The connection feature may protrude away from the electrochemical battery cell to operatively establish an electrical connection with the external circuit. This is usually accomplished by connecting the protruding connection features associated with the negative and positive electrodes to negative and positive terminals, respectively, in either a serial or parallel relationship with the connection features associated with other electrochemical battery cells. Negative and positive terminals may not be needed, however, if the secondary liquid-electrolyte battery includes only one electrochemical battery cell.

The connection feature included on a metallic current collector is commonly located near a peripheral edge of the current collector for various practical reasons including, among others, accessibility. But locating the connection feature in this way can cause an uneven current density distribution to develop within the electrochemical battery cell. For instance, during oxidation of the associated electrode, the connection feature may have a tendency to draw electric current from a nearby portion of the electrode at a greater rate than more distant portions. Likewise, during reduction of the associated electrode, the connection feature may have a tendency to make electric current more readily available for ionic species reduction at a nearby portion of the electrode as opposed to other portions further removed. Such differences in electrochemical activity can become even more pronounced if the connection features of the metallic current collectors are all located on the same side of the cell. Nonetheless, however developed, a region of the electrochemical battery cell that experiences disparately greater current density can result in some potentially undesirable effects over the life of the battery.

SUMMARY OF THE DISCLOSURE

A porous polymer separator layer that may function as all or part of a separator for an electrochemical battery cell (sometimes referred to as "a cell" or "the cell" for brevity) of a secondary liquid-electrolyte battery, such as a lithium ion battery, and a method of making the same are disclosed. The porous polymer separator layer includes a first edge and a second edge that define a width of the separator layer, and a first major face and a second major face extending between the first and second edges that define a thickness of the separator layer. The first edge has a first height and the second edge has a second height. Each of the first and second heights establish the thickness of the porous polymer separator layer at the first and second edges, respectively, and together provide the separator layer with a non-uniform cross-sectional thickness spanning the width of the separator layer. To establish this non-uniform cross-sectional thickness, for example, the first height of the first edge is rendered greater than the second height of the second edge so that the thickness of the porous polymer separator layer decreases from the first edge to the second edge as the major faces converge towards one another.

The structure of the porous polymer separator layer is provided by a polymer matrix comprised of a polyolefin. The polymer matrix includes a porosity that traverses the thickness of the porous polymer separator layer and connects the opposed first and second major faces. Such a porosity is derived from pores that are distributed throughout the polymer matrix. These pores are generally small enough and sufficiently distributed that contact between the electrode surfaces situated on opposite sides the porous polymer separator layer can be prevented yet still large enough and adequately interconnected to contain a liquid electrolyte and facilitate ion transport. The porosity of the porous polymer separator layer as a whole is usually anywhere between about 30% and about 90%. The porosity may be distributed to allow communication of an ionic species through the thickness of the porous polymer separator layer coextensively between the first and second opposed major faces when an infiltrated liquid electrolyte is present. In a preferred embodiment, moreover, the porosity is evenly distributed throughout the porous polymer separator layer.

The porous polymer separator layer, when incorporated into an electrochemical battery cell of a secondary liquid-electrolyte battery, may be oriented in a way that helps maintain a more evenly distributed current density within the cell. To accomplish this objective, for example, the porous polymer separator layer may be oriented so that the first edge is located between confronting surfaces of a negative electrode and a positive electrode in a region of the cell where the electrodes are prone to experience increased relative electrochemical activity. Orienting the first edge of the porous polymer separator layer in this way compensates for the tendency to experience increased localized electrochemical activity in that particular region of the cell by making the mobile ionic species travel a greater distance through the thicker edge of the separator layer. The electrochemical activity experienced throughout the electrodes, and thus the current density of the electrochemical battery cell, is therefore more equalized since the porous polymer separator layer renders the ionic species more evenly available to the electrodes despite differing electrochemical driving forces.

The porous polymer separator layer may be made by a process in which the separator layer is derived from a film having a non-uniform cross-sectional thickness similar to that sought to be imparted to the resultant separator layer. This process may involve (1) forming a film that has a cross-section with a non-uniform thickness from a polymer composition and (2) deriving the porous polymer separator layer from the film. Deriving the porous polymer separator layer may be accomplished according to a "dry" working process or a "wet" working process. In the dry working process, the polymer composition includes a polyolefin and, optionally, particles having a melting temperature equal to or greater than the polyolefin. The polymer composition is heated to melt the polyolefin, then formed into the film, and followed by annealing of the film and then uniaxial stretching of the film to form the porous polymer separator layer. In the wet working process, the polymer composition includes a polyolefin, a plasticizer absorbed into the polyolefin, and, optionally, particles having a melting temperature equal to or greater than the polyolefin. The polymer composition is heated to melt the polyolefin, then and formed into the film, and followed by biaxial stretching of the film and extraction of the plasticizer from the film to form the porous polymer separator layer.

DETAILED DESCRIPTION

Figure 1:
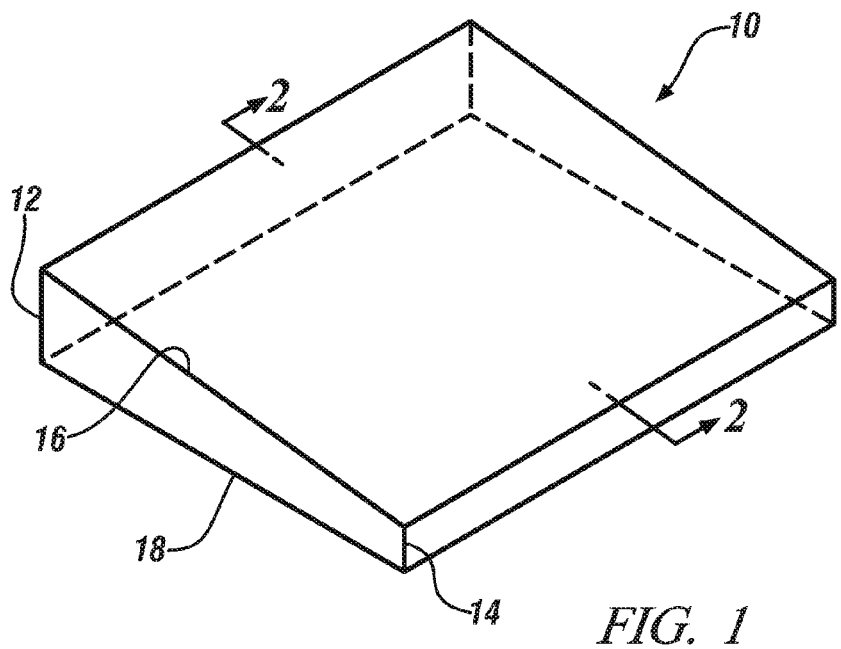
FIG. 1 is a generalized perspective view of a porous polymer separator layer for use in an electrochemical battery cell of a secondary liquid-electrolyte battery.

A preferred exemplary embodiment of a porous polymer separator layer 10 having a non-uniform cross-sectional thickness, and a method of making the separator layer 10 by a working process, are disclosed. The porous polymer separator layer 10 may be used in an electrochemical battery cell of a secondary liquid-electrolyte battery. An electrochemical battery cell of this type generally includes a negative electrode, a positive electrode, and a separator disposed between, and in interfacial contact with, the two electrodes. It further satisfies two general operational requirements: first, the electrochemical half-reactions that take place at the negative and positive electrodes are reversible so that the cell's capacity can be discharged multiple times and, second, the separator situated between the negative and positive electrodes is infiltrated with a liquid electrolyte that can communicate an electrochemically appropriate ionic species between the electrodes. Some notable examples of a secondary liquid-electrolyte battery that contains at least one such electrochemical battery cell—and usually a plurality of such cells electrically coupled together depending on the expected use of the battery—are a lithium ion battery, a nickel-cadmium battery, a nickel-metal hydride battery, and a lead-acid battery.

The separator is included in the electrochemical battery cell to physically separate and electrically insulate the electrodes while permitting the internal migration of a mobile ionic species through its infiltrated liquid electrolyte. The porous polymer separator layer 10 disclosed here is mechanically and thermally stable enough, and is sufficiently porous, that it may function entirely as a single-layer separator or it may be combined with other materials to fabricate a multi-component composite separator. The porous polymer separator layer 10, on account of its non-uniform cross-sectional thickness, can also be oriented relative to the negative and positive electrodes to achieve a more evenly distributed current density within the cell. This may be accomplished by positioning the thicker portion of the porous polymer separator layer 10 between the surfaces of the negative and positive electrodes at a region of the cell where the electrodes have a tendency to experience more electrochemical activity because of some driving force such as, for example, a close proximity to a connection feature of an associated metallic current collector.

The porous polymer separator layer 10 will now be described in more detail within the context of an electrochemical battery cell for a lithium ion battery. This type of battery technology is considered by the automobile industry to be one of the primary candidates for integration into the powertrains of a hybrid electric vehicle (HEV) and an extended range electric vehicle (EREV), as well as other possible applications. Skilled artisans will, however, be more than capable of adapting this disclosure to the other types of secondary liquid-electrolyte batteries mentioned before. This is because the use of the porous polymer separator layer 10 in an electrochemical battery cell of a lithium ion battery is generally representative of how the separator layer 10 would be used in those other types of liquid-electrolyte batteries. The fact that each of the previously-mentioned liquid-electrolyte batteries contains one or more electrochemical battery cells having different electrode constructions, different liquid electrolytes, and different electrochemical mechanisms is not considered to be a significant impediment to the robust use of the porous polymer separator layer 10.

Figure 2:
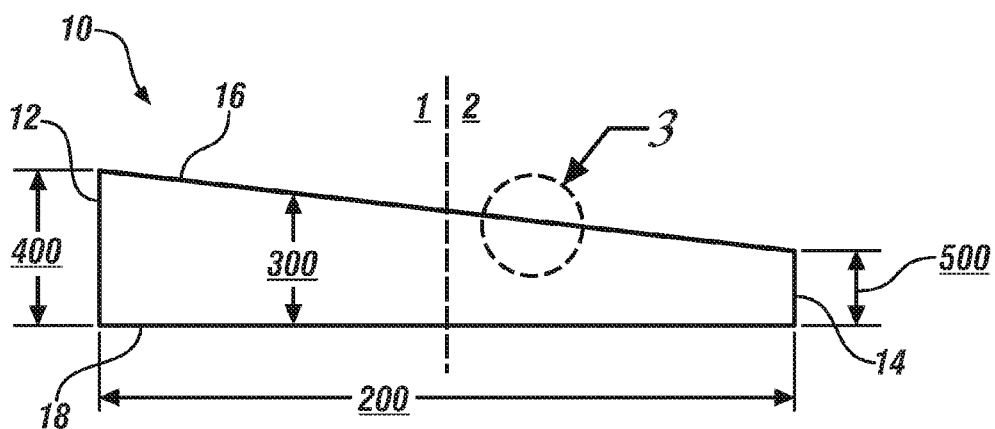
FIG. 2 is a generalized cross-sectional view of the porous polymer separator layer shown in FIG. 1 taken along the line 2-2.
Figure 3:
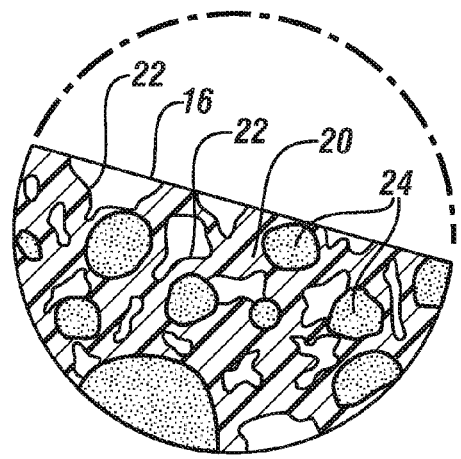
FIG. 3 is a generalized and partially magnified cross-sectional view of the porous polymer separator layer taken from the encircled portion of FIG. 2 and identified by the numeral 3.

FIGS. 1-3 illustratively show an idealized depiction of the porous polymer separator layer 10 that may function as all or part of a separator for use in an electrochemical battery cell of a lithium ion battery. The porous polymer separator layer 10 includes a first edge 12 and a second edge 14 opposite the first edge 12. These edges 12, 14 define a width 200 of the porous polymer separator layer 10. Extending between the first and second edges 12, 14 opposite one another is a first major face 16 and a second major face 18. These faces 16, 18 define a thickness 300 of the porous polymer separator layer 10 in a direction generally perpendicular to the width 200 direction. The first and second major faces 16, 18 are significantly larger in surface area than the first and second edges 12, 14 because they are intended to emulate the size of the spaced-apart confronting surfaces of a negative electrode and a positive electrode which, in the construct of an electrochemical battery cell of a lithium ion battery, are situated on opposite sides of the separator layer 10.

The porous polymer separator layer 10, as shown best in FIG. 2, has a cross-section spanning its width 200 that exhibits a non-uniform thickness. This cross-section includes the first edge 12, which has a first height 400, and the second edge 14, which has a second height 500. These first and second edge heights 400, 500 establish the spacing between the first and second major faces 16, 18 and, consequently, the thickness 300 of the porous polymer separator layer 10 at the first and second edges 12, 14, respectively. Moreover, in terms of their relationship, the height 400 of the first edge 12 is greater than the height 500 of the second edge 14 such that the thickness 300 of the porous polymer separator 10 decreases from the first edge 12 to the second edge 14 as the major faces 16, 18 converge towards one another. The difference between the heights 400, 500 of the first and second edges 12, 14 is not a random variation that falls within an acceptable tolerance range usually associated with a uniform cross-sectional thickness; rather, it is meant and controlled to be more pronounced. The height 400 of the first edge 12, more specifically, in a preferred embodiment, is about 2% to about 50% greater than the height 500 of the second edge 14, more preferably about 5% to about 40% greater, and most preferably about 5% to about 30% greater.

The heights 400, 500 of both the first and second edges 12, 14 are preferably between about 5 μm and about 50 μm, more preferably between about 10 μm and about 45 μm, and most preferably between about 20 μm and about 35 μm while maintaining their differential height relationship. For example, if the height 500 of the second edge 14 is 20 μm, then the height 400 of the first edge 14 is preferably between about 20.4 μm (2% greater) to about 30 μm (50% greater), more preferably between about 21 μm (5% greater) to about 28 μm (40% greater), and most preferably between about 21 μm (5% greater) to about 26 μm (30% greater). The exact height difference sought to be achieved between the first and second heights 400, 500 for a given lithium ion battery application, however, depends on several factors. Considerations like the composition of the porous polymer separator layer 10, the composition and construction of the negative and positive electrodes, and the surface areas of the first and second major faces 16, 18, to name but a few factors, would all be considered by a skilled artisan when selecting a target height 400, 500 for the first and second edges 12, 14 and the corresponding non-uniform thickness at the cross-section of the porous polymer separator layer 10.

The bulk structure of the porous polymer separator layer 10 is provided by a polymer matrix 20, as depicted generally in FIG. 3. The polymer matrix 20 is comprised of a polyolefin. This type of polymer is derived at least in part from olefinic monomers that encompass a variety of acyclic hydrocarbon compounds having a reactive carbon-carbon double bond (i.e., —C=C). The polyolefin designation as used here broadly includes a polyolefin homopolymer, a polyolefin-based heteropolymer (i.e., a copolymer), or a blend of more than one type of polyolefin constituent. Some specific examples of the polyolefin include, for example, polyethylene (PE) including any of its variations (such as HDPE, LDPE, LLDPE, and UHMWPE), polypropylene (PP), or a blend of PE and PP. But the most preferred composition of the polymer matrix 20 is PE or PP in part because of the mechanical and chemical stability, acceptable cost, and ease of manufacture of those two polyolefinic materials.

In order to accommodate the internal communication of lithium ions, a porosity that traverses the thickness 300 of the porous polymer separator layer 10 and connects the opposed first and second major faces 16, 18 is provided within polymer matrix 20. The term "porosity" as used here refers to the volume percentage of the porous polymer separator 10 within the polymer matrix 20 that is occupied by pores 22, which are depicted generally in FIG. 3 although not necessarily to scale. These pores 22 may vary in size, shape, and spacing. But collectively they are generally small enough and sufficiently distributed to prevent contact between the confronting surfaces of the negative and positive electrodes the separator layer 10 is meant to separate yet still large enough and adequately interconnected to contain a liquid electrolyte and facilitate lithium ion mobility. A notable proportion of the pores, for instance, preferably has at least one cross-sectional dimension sized between 0.01 to 2.0 μm, although such a size range is not exclusive or even necessary to ensure proper operability of the porous polymer separator layer 10. Larger and smaller cross-sectional pore sizes may be present depending on the thickness 300 of the porous polymer separator layer 10, the particular lithium ion battery application in which the porous polymer separator layer 10 is employed, and various other considerations known to skilled artisans.

The porosity of the porous polymer separator layer 10 as a whole is preferably anywhere between about 30% and about 90% and most preferably between about 40% and 70%. The porosity may be distributed such that lithium ions can be communicated through the thickness 300 of the porous polymer separator layer 10 coextensively between the first and second opposed major faces 16, 18 when the separator layer 10 is infiltrated with a liquid electrolyte. The porosity may further be evenly distributed throughout the porous polymer separator layer 10. An evenly distributed porosity would be present if, referring for the moment back to FIG. 2, the cross-section taken across the width 200 of the porous polymer separator layer 10 is divided vertically along the thickness 300 direction into two segments of equal width, one that includes the first edge 12 (segment 1) and one that includes the second edge 14 (segment 2), and the porosity of those segments as measured by any suitable technique, such as mercury porosimetry, deviates from the porosity of the porous polymer separator layer 10 as a whole by no more than 3%. For example, if the entire porous polymer separator layer 10 has a porosity of 60%, and a segment 1 and a segment 2 of the porous polymer separator layer 10 are obtained as just described, and each of those segments has a porosity within the range of 57% to 63%, then the porous polymer separator layer 10 can be said to have an evenly distributed porosity.

One or more types of particles 24 having a melting temperature equal to or higher than the melting temperature of the polyolefin that constitutes the polymer matrix 20 may be dispersed, if desired, within the polymer matrix 20, as depicted generally in FIG. 3. The presence of such particles 24 may enhance the mechanical properties of the porous polymer separator layer 10 and help mitigate or altogether prevent thermal shrinkage. Some particular types of particles 24 that may be employed include ceramic particles, cross-linked thermoset polymer particles, and engineering thermoplastic polymer particles, to name but a few examples. Exactly how much of the particles 24 are dispersed within the polymer matrix 20 is subject to a wide variance. In many instances, however, the particles 24 are preferably present in an amount that ranges from about 0 wt. % to about 400 wt. % of the polymer matrix 20; that is, the porous polymer separator layer 10 may comprise, by weight, up to about 80% of the dispersed particles 24 based on the total weight of the polymer matrix 20 and the particles 24. A preferred particle diameter for the particles 24 is about 0.005 µm to about 15 µm and, most preferably, from about 0.05 µm to about 3 µm.

Many specific materials may be employed as the optionally-dispersed particles 24. Some examples of suitable ceramic particles include those of alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, petalite, and mixtures thereof. Some examples of suitable cross-linked thermoset polymer particles include the cured forms of polyimides, polyurethanes, phenol-formaldehyde resins, melamine-formaldehyde resins, epoxy resins, and mixtures thereof. Some examples of suitable engineering thermoplastic polymer particles include those of a polyimide such as polyetherimide, a polyketone such polyether ketone (PEK), polyether ether ketone (PEEK), and polyarylether ketone (PAEK), a polysulfone such as standard polysulfone, polyarylsulfone, polyethersulfone, and polyphenylsulfone, polyethylene terephthalate, polyphenylene sulfide, ethylene-vinyl acetate, and mixtures thereof. Of course other types of materials not specifically listed above may also be used to fabricate the particles 24 as is generally understood by skilled artisans.

Figure 4:
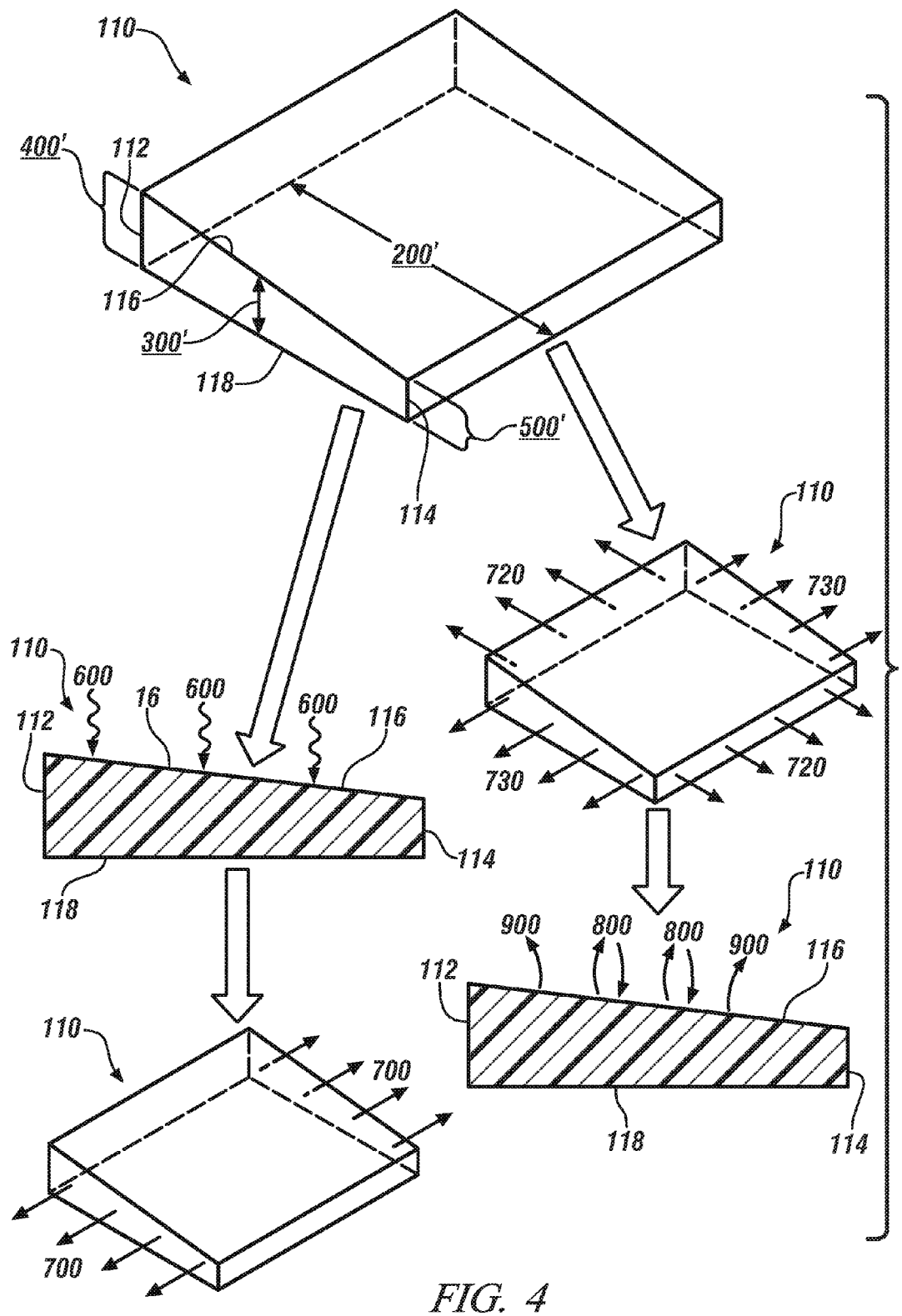
FIG. 4 is a general and diagrammatic depiction of a dry working process (left side) and a wet working process (right side) that may be used to make the porous polymer separator layer shown in FIGS. 1-3.

The porous polymer separator layer 10 may be made by a working process shown generally and diagrammatically in FIG. 4. This process includes (1) forming a film 110, which has a cross-section with a non-uniform thickness, from a polymer composition and (2) deriving the porous polymer separator layer 10 with its ascribed porosity from the film 110. Deriving the porous polymer separator layer 10 may be accomplished according to a "dry" working process or a "wet" working process depending on the preference of a skilled artisan. Each of these processes can achieve the desired porosity of the porous polymer separator layer 10 as described above albeit with slightly different structural morphologies. Making the porous polymer separator layer 10 by way of the dry working process, for instance, produces relatively small slit-like pores within the polymer matrix 20 and provides the separator layer 10 with anisotropic mechanical properties. Employing the wet working process, on the other hand, produces more proportionately-sized pores and provides the separator layer 10 with more isotropic mechanical properties. The "dry" and "wet" working processes will be described below in further detail. Additional processing may be performed after the porous polymer separator layer 10 is made such as, for example, cutting or trimming or otherwise shaping the separator layer 10 in light of its expected use, as well as combining the separator layer 10 with another material or layer to form a multi-component composite separator if desired.

The polymer composition used to make the film 110 includes the polyolefin selected to fabricate the polymer matrix 20. Selection of the particular polymer material may depend on several factors including its mechanical strength, temperature resistance, chemical resistance, cost, availability, and ease of manufacturing. The polymer composition may further include a plasticizer if the wet working process is used to make the porous polymer separator layer 10. Other materials may also be included in the polymer composition including the particles 24 having a melting temperature equal to or higher than the melting temperature of the polyolefin that comprises the polymer matrix 20. Additives such as viscosity modifiers, antioxidants, antistatic agents, and other processing aids may also be included in the polymer composition especially if the wet working process is utilized.

The amounts of the several materials that may be included in the polymer composition are determined based on several factors such as the intended thickness, porosity, and mechanical properties of the porous polymer separator layer 10. But in general they typically fall within the ranges of about 20 wt. % to about 100 wt. % of the polyolefin based on the weight of the polymer composition if no plasticizer is present, about 20 wt. % to about 95 wt. % of the polyolefin based on the weight of the polymer composition if a plasticizer is present, about 5 wt. % to about 70 wt. % of the plasticizer, if included, based on the total weight of the polyolefin and the plasticizer, and about 10 wt. % to about 400 wt. % of the particles 24, if included, based on the weight of the polyolefin included in the polymer composition. Of course the exact amounts of each material used can be determined by as skilled artisan and adjusted accordingly, as needed, to achieve the desired structure and properties of the porous polymer separator layer 10.

The polymer composition may be heated and mechanically worked to melt the polyolefin and disperse the optionally-included particles 24. Melting the polyolefin allows the polymer composition to be formed into the film 110 with relative ease. The polymer composition, when heated, may include a melt of the polyolefin (hereafter referred to as a "polyolefin melt") or a melt mixture of the polyolefin (hereafter referred to as a "polyolefin melt mixture") during formation into the film 110. A polyolefin melt refers to embodiments in which the melted polyolefin is not mixed with a plasticizer. This type of polymer composition is generally used during practice of the dry working process. Conversely, a polyolefin melt mixture refers to embodiments in which the melted polyolefin is mixed with a plasticizer. This type of polymer composition is generally used during practice of the wet working process. The temperature of the polymer composition that needs to be achieved to maintain the polyolefin melt or melt-mixture during formation of the film 110 may vary. But in most instances a temperature between about 90° C. to about 180° C. is sufficient during formation of the film 110 to ensure proper flow and formability.

The film 110 of the polymer composition may be formed by any suitable procedure notwithstanding the contents of the polymer composition or the stretching technique employed. The film 110 is formed to have the same basic shape as the resultant porous polymer separator layer 10 albeit with a greater thickness 300' dimension and possibly a lesser width 200' dimension to accommodate for the effects of subsequent stretching. In other words, the film 110 has a first edge 112, a second edge 114 opposite the first edge 112, and opposed first and second major faces 116, 118 extending between the first and second edges 112, 114. The first and second edges 112, 114 define a width 200' of the film 110 and the first and second major faces 116, 118 define a thickness 300' of the film 110 generally perpendicular to the width 200' direction. Still further, the first edge 112 has a height 400' that is greater than a height 500' of the second edge 114, so that, like the porous polymer separator layer 10, a cross-section of the film 110 spanning its width 200' exhibits a non-uniform thickness. Each height 400', 500' dimension is typically about 20% to about 200% greater than the desired corresponding height 400, 500 dimension of the porous polymer separator layer 10. The width 200' dimension of the film 110 may be equal to the width 200 dimension of the porous polymer separator layer 10 or, in some embodiments, less than the width 200 dimension of the porous polymer separator layer 10 by about 5% to about 50%.

The film 110 is preferably formed by a film extrusion procedure. Such a procedure generally involves pushing the polymer composition through a non-uniform opening of an extruder die at a temperature sufficient to at least temporarily maintain the polyolefin in melt or melt-mixed form (i.e., between about 90° C. to about 180° C.). The film 110 is urged through the opening of the extrusion die along an extrusion direction (sometimes referred to as the machine direction) with the width 200' of the film 110 being oriented transverse to the extrusion direction. A roller or a succession of rollers (not shown) may receive the film 110 as it emerges from the extruder die. The roller(s) may be configured to quench the film 110 as is generally well understood in the art. Other procedures may of course be used to produce the film 110 besides film extrusion. Procedures such as blown extrusion, slot-die coating, comma-bar coating, and other procedures not specifically mentioned here but known to skilled artisans, may also be employed to form the film 110.

Deriving the porous polymer separator layer 10 from the film 110 usually involves stretching the film 110 according to known techniques. The film 110 may be stretched either uniaxially or biaxially. Such stretching causes the thickness 300' of the film 110 to decrease—and the width 200' of the film 110 to increase if stretching is practiced in the width 200' direction—and also helps cultivate the porosity ultimately provided in the separator layer 10. In other words, the first edge 12, the second edge 14, the first major face 16, and the second major face 18 of the porous polymer separator layer 10 are derived, respectively, from the first edge 112, the second edge 114, the first major face 116, and the second major face 118 of the film 110. The height relationship originally devised between the first and second edges 112, 114 of the film 110 is also maintained during stretching of the film 110 such that the height 400 of the first edge 12 of the porous polymer separator layer 10 is greater than the height 500 of the second edge 14 as previously described. The intricacies of both the "dry" and "wet" working processes will now be described in more detail.

Dry Process

In the dry process, which is depicted generally and diagrammatically on the left side of FIG. 4, the polymer composition comprises a polyolefin selected to constitute the polymer matrix 20 of the porous polymer separator layer 10 but does not include a plasticizer. Heating the polymer composition and melting the polyolefin thus produces a polyolefin melt. The particles 24 may be included in the polymer composition, if desired, for suspension in the polyolefin melt during formation of the film 110 and eventual dispersal within the polymer matrix 20. The heated polymer composition is preferably formed into the film 110 with a non-uniform cross-sectional thickness and a width 200' approximately equal to the intended width 200 of the porous polymer separator layer 10 being made as has been previously described. The film 110 is then cooled in the ambient environment to allow the polyolefin melt to solidify and crystallize. Such crystallization of the polyolefin melt forms ordered lamellae crystallite regions bordered by amorphous phase regions throughout the film 110 within the solidified polyolefin. The film 110 is considered "dry" at this point since the polyolefin is solidified and no plasticizer is present.

The film 110 is then annealed to further crystallize the polyolefin. Annealing is preferably performed by heating the film 110 to a temperature within 50° C. of the melting point of the polyolefin for a suitable length of time (represented by the arrows identified as 600). This typically entails heating the film 110 to somewhere in the range of 70° C. to about 140° C. in an oven or other suitable heating contraption for a few seconds up to several tens of minutes depending on the particular polyolefin present and the thickness of the film 110. The additional heat treatment associated with annealing produces more lamellae crystallite regions within the polyolefin and reinforces the ones formed during cooling of the polyolefin melt. The many lamellae crystallite regions situated throughout the polyolefin establish boundaries with the amorphous phase regions. These boundaries eventually become the pores 22 in the polymer matrix 20 following stretching of the film 110 into the porous polymer separator layer 10.

The film 110 is then uniaxially stretched in a direction perpendicular to its width 200' (represented by the arrows identified as 700) to form the porous polymer separator layer 10. If the film 110 has been formed by extrusion, this stretching would be performed in the extrusion direction. Stretching the film 110 in this way pulls apart the lamellae crystallite regions and the surrounding amorphous phase regions present throughout the polyolefin and forms the polymer matrix 20 with an internal distribution of the pores 22 that provide the porous polymer separator layer 10 with its porosity. A similar mechanism occurs around the particles 24 contained in the film 110 during stretching to further enhance the porosity of the separator layer 10 if those particles 24 are indeed present. The film 110 may also be stretched in a direction parallel to the width W' of the film 110, if desired, to try and further affect the size and shapes of the pores 22. But such stretching is typically omitted since it tends to have little impact the porosity of the porous polymer separator layer 10 because of the way the lamellae crystallite regions are oriented.

The uniaxial stretching of the film 110 maintains the height relationship between the first and second edges 112, 114 since the film 110 is stretched perpendicular to its width 200' in a fairly uniform fashion. Moreover, to help stretch the film 110 uniformly, heat may be applied to the first edge 112 of the film 110 in a greater amount than the second edge 114 to establish a temperature gradient across the width 200' of the film 110. A temperature gradient of this type can equalize the modulus of elasticity—which is inversely proportional to temperature—of the first and second edges 112, 114 so that the heights 400', 500' of these edges 112, 114 are reduced by substantially the same amount during stretching of the film 110. The heat applied to the first edge 112 of the film 110 is preferably modest enough that the temperature in that area of the film 110 remains lower than the annealing temperature so that localized annealing of only part of the film 110 is avoided.

Wet Process

In the wet process, which is depicted generally and diagrammatically on the right side of FIG. 4, the polymer composition comprises a polyolefin selected to constitute the polymer matrix 20 of the porous polymer separator layer 10 and a plasticizer. The plasticizer included in the polymer composition is a low volatility organic liquid that can be absorbed into the polyolefin and, once absorbed, lowers the glass transition temperature of the polyolefin. The addition of the plasticizer therefore generally provides the polyolefin with enhanced flexibility, resiliency, and melt flow capabilities. Any plasticizer that is compatible with the polyolefin may be used. One such plasticizer is mineral oil. Mineral oil is comprised of a mixture of heavy alkanes derived from petroleum or some other non-vegetable source. At least 80% of the alkanes are preferably in the C15-C40 range and the boiling point of the mineral oil is greater than about 320° C. and typically greater than 350° C. A specific type of mineral oil that is preferably employed is paraffin oil. Paraffin oil is contains at least 80% of n-alkanes in the C15-C40 range and is generally commercially available from numerous suppliers including, for example, Chevron and Exxon Mobile. Various additives may also be included into the polymer composition.

Heating the polymer composition and melting the polyolefin thus produces a polyolefin melt mixture. The particles 24 may be included in the polymer composition, if desired, for suspension in the polyolefin melt mixture during formation of the film 110 and eventual dispersal within the polymer matrix 20. The heated polymer composition is preferably formed into the film 110 with a non-uniform cross-sectional thickness and a width 200' less than the intended width 200 of the porous polymer separator layer 10 being made as has been previously described. The film 110 is then cooled in the ambient environment to allow the polyolefin melt mixture to gelatinize. Such gelatinization results in the absorbed plasticizer being trapped throughout the film 110 within the gelled polyolefin as small liquid confinements that occupy future pore sites. The film 110 is considered "wet" at this point since the polyolefin is gel-like in appearance due to the presence of the plasticizer.

After being formed, the film 110 may be stretched biaxially in a direction parallel to the width 200' of the film 110 (represented by the arrows identified as 720) and a direction perpendicular to the width 200' (represented by the arrows identified as 730) of the film 110. If the film 110 has been formed by extrusion, this stretching would be performed in both the extrusion and transverse directions. Stretching the film 110 in this way enlarges the future pore sites occupied by the plasticizer within the gelled polyolefin. A similar mechanism occurs around the particles 24 contained in the film 110 during stretching to further enhance the porosity of the separator layer 10 if those particles 24 are indeed present. Biaxial stretching is more constructive here than in the dry working process because ordered lamellae crystallite regions that can restrict stretching in a direction parallel to the width 200' of the film 110 are generally not produced in the gelled polyolefin when the film 110 is formed.

The biaxial stretching of the film 110 maintains the height relationship between the first and second edges 112, 114 since the film 110 is stretched both parallel and perpendicular to its width 200' in a fairly uniform fashion. Moreover, to help stretch the film 110 uniformly, heat may be applied to the first edge 112 of the film 110 in a greater amount than the second edge 114 to establish a temperature gradient across the width 200' of the film 110. A temperature gradient of this type can equalize the modulus of elasticity—which is inversely proportional to temperature—of the first and second edges 112, 114 so that the heights 400', 500' of these edges 112, 114 are reduced by substantially the same amount during stretching of the film 110. The heat applied to the first edge 112 of the film 110, like in the dry working process, is preferably modest enough that the temperature in that area of the film 110 remains lower than the annealing temperature so that localized annealing of only part of the film 110 is avoided.

The plasticizer contained in the film 110 is then extracted to form the porous polymer separator layer 110. The plasticizer may be extracted by washing the film 110 with solvent that is miscible with, and more volatile than, the plasticizer but does not dissolve or absorb into the polyolefin. Such washing may involve immersing the film 110 into a bath that includes the volatile solvent or some other suitable procedure. The presence of the volatile solvent (represented by the arrows identified as 800) in an around the film 110 during washing draws the plasticizer (represented by the arrows identified as 900) out of the polyolefin and leaves behind the polymer matrix 20 with an internal distribution of the pores 22 that provide the porous polymer separator layer 10 with its porosity. Very little if any of the volatile solvent usually remains within the porous polymer separator layer 10 after the separator layer 10 is removed from the bath or at the conclusion of whatever washing procedure is performed. But to be sure the porous polymer separator layer 10 may be optionally heated to remove any residual volatile solvent that may still be present. A preferred volatile solvent that may be used to extract the plasticizer from the film 110 is methylene chloride ($CH_2Cl_2$).

It should be noted that the order in which stretching of the film 110 and extraction of the plasticizer from the film 110 are performed in the exemplary wet working embodiment just described may be switched. That is, after the film 110 is formed, the plasticizer may be extracted from the film 110 followed by biaxial stretching of the film 110 to form the porous polymer separator layer 10. The order in which these two acts are performed may have some impact the structure or function of the porous polymer separator layer 10. Stretching the film 110 before extracting the plasticizer may result in more proportionately-sized pores than when those two acts are reversed. Both ways of practicing the stretching and extracting acts are nonetheless fully acceptable in the fabrication of the porous polymer separator layer 10 and, in some instances, are implemented in one way or the other based on manufacturing practicalities as opposed to some performance-related reason.

Referring now back to FIGS. 1-3, the porous polymer separator layer 10 may be used in a way that helps maintain a more evenly distributed current density in an electrochemical battery cell of a lithium ion battery. To be used for such a purpose, for example, the porous polymer separator layer 10 may be oriented within the cell such that the first edge 12 is located between confronting surfaces of the negative and positive electrodes in a region of the cell where the electrodes are prone to experience increased relative electrochemical activity. Oftentimes this region coincides with a side of the electrochemical battery cell proximate a connection feature of a metallic current collector associated with the negative electrode and/or a connection feature of a metallic current collector associated with the positive electrode. Orienting the first edge 12 of the porous polymer separator layer 10 in this way compensates for the tendency to experience increased localized electrochemical activity in that particular region of the cell by making the lithium ions travel a greater distance through the first edge 12 of the separator layer 10 relative to the second edge 14. In other words, because of their height differences, the first edge 12 of the porous polymer separator layer 10 provides a greater overall resistance to lithium ion transport between the electrodes than the second edge 14 and, as such, orienting those edges 12, 14 at regions of the cell having expectations of greater and lesser relative electrochemical activities, respectively, helps equalize the electrochemical activity between the electrodes throughout the cell.

The ability of the porous polymer separator layer 10 to help maintain a more evenly distributed current density can enhance the longevity and reliability of the electrochemical battery cell in some instances. One potential benefit of a more evenly distributed current density is the better utilization of the electrodes; that is, the portions of the electrodes closer to the connection features of the metallic current collectors will be less likely to decay at an accelerated rate while the portions more removed from the connection features will be less likely to be operationally underused. Another potential benefit of a more evenly distributed current density is a more even temperature distribution within the cell. The avoidance of localized high temperature spots due to increased relative electrochemical activity can help maintain the integrity of the separator which, in addition to the porous polymer separator layer 10, may include one or more polymer components that are susceptible to degradation at an elevated temperature. Yet another potential benefit of a more evenly distributed current density is better dimensional stability of the cell. For instance, the electrochemical battery cell may expand during the charging phase and contract during the discharge phase. A more evenly distributed current density can help achieve more uniform expansion and contraction of the electrodes and, as a result, reduce the occurrence of mechanical strains and corresponding stresses that can lead to loss of contact between the electrodes and the interadjacent separator.

Figure 5:
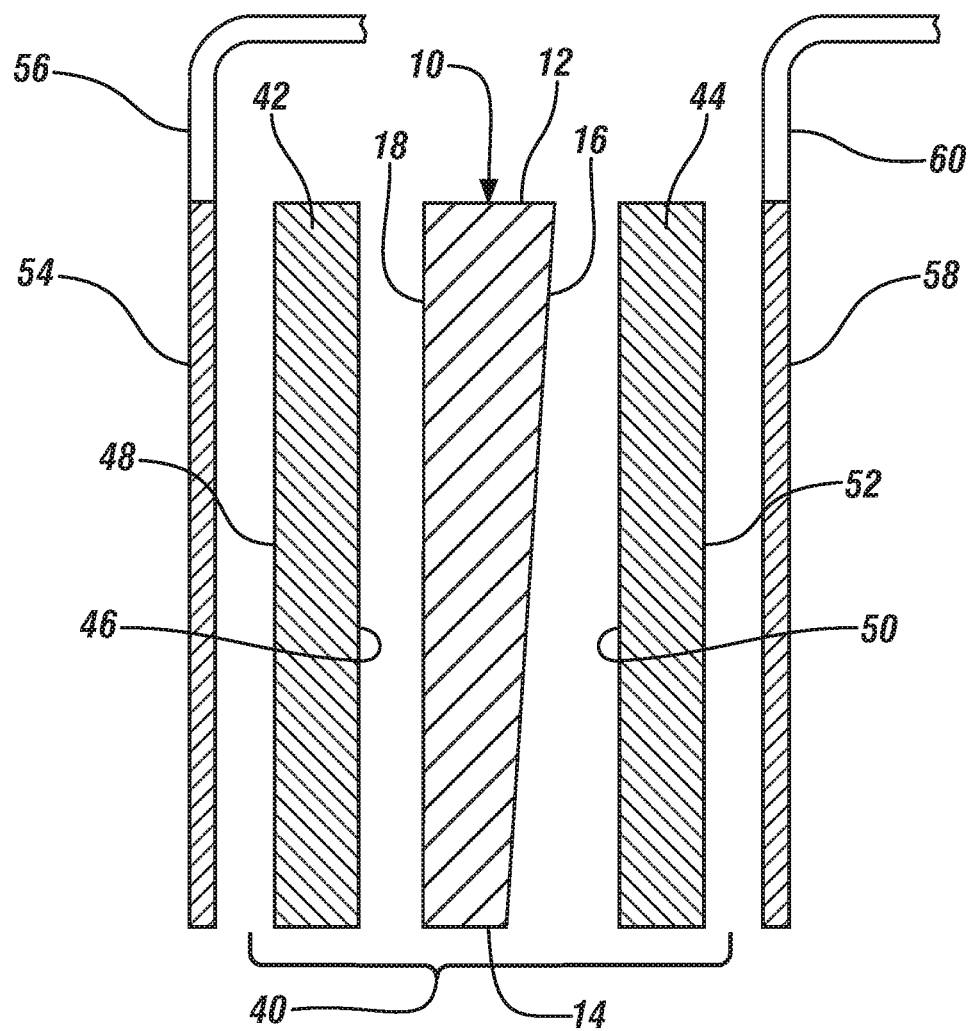
FIG. 5 is a generalized cross-sectional view of an electrochemical battery cell for a lithium ion battery that includes a negative electrode, a positive electrode, and the porous polymer separator layer depicted in FIGS. 1-3 disposed between the negative and positive electrodes.

The porous polymer separator layer 10 may be assembled into an electrochemical battery cell 40 of a lithium ion battery as depicted, for example, in the exploded cross-sectional view of FIG. 5. The electrochemical battery cell 40 includes a negative electrode 42, a positive electrode 44, and the porous polymer separator layer 10 disposed between the two electrodes 42, 44. The negative electrode 42 includes an inner face surface 46 and an outer face surface 48 relative to the location of the porous polymer separator layer 10. The positive electrode 44 similarly includes an inner face surface 50 and an outer face surface 52. And when assembled into the electrochemical battery cell 40, the inner face surfaces 46, 50 of the negative and positive electrodes 42, 44 confront one another and are pressed against the second major face 18 and the first major face 16 of the porous polymer separator layer 10, respectively, as shown. Of course other arrangements of the porous polymer separator layer 10 are possible. For instance, the porous polymer separator layer 10 could be arranged so that the inner face surface 46 of the negative electrode 42 is pressed against the first major face 16 of the separator layer 10 and the inner face surface 50 of the positive electrode 44 is pressed against the second major face 18. The porous polymer separator layer 10 may also be combined with other materials or layers to form a multi-component composite separator in which one or both of the first and second major faces 16, 18 is no longer pressed against their respective electrode inner face surfaces 46, 50.

Situated on each side of the electrochemical battery cell 40 is a metallic current collector that includes a connector tab for accommodating an electrical connection. More specifically, a negative-side metallic current collector 54 that includes a projecting negative polarity tab 56 is associated with the negative electrode 42 and a positive-side metallic current collector 58 that includes a projecting positive polarity tab 60 is associated with the positive electrode 44. The negative-side metallic current collector 54 supports the outer face surface 48 of the negative electrode 42 and the positive-side metallic current collector 50 supports the outer face surface 52 of the positive electrode 44. The metallic current collectors 54, 58 also preferably engage their respective electrode outer face surfaces 48, 52 over an appreciable interfacial surface area, as shown, to facilitate the efficient collection and distribution of free electrons. Each of the metallic current collectors 54, 58 may be constructed from any of a wide variety of electrically conductive metal. In a preferred embodiment, however, the negative-side metallic current collector 54 is a thin-film copper foil and the positive-side metallic current collector 58 is a thin-film aluminum foil.

Figure 6:
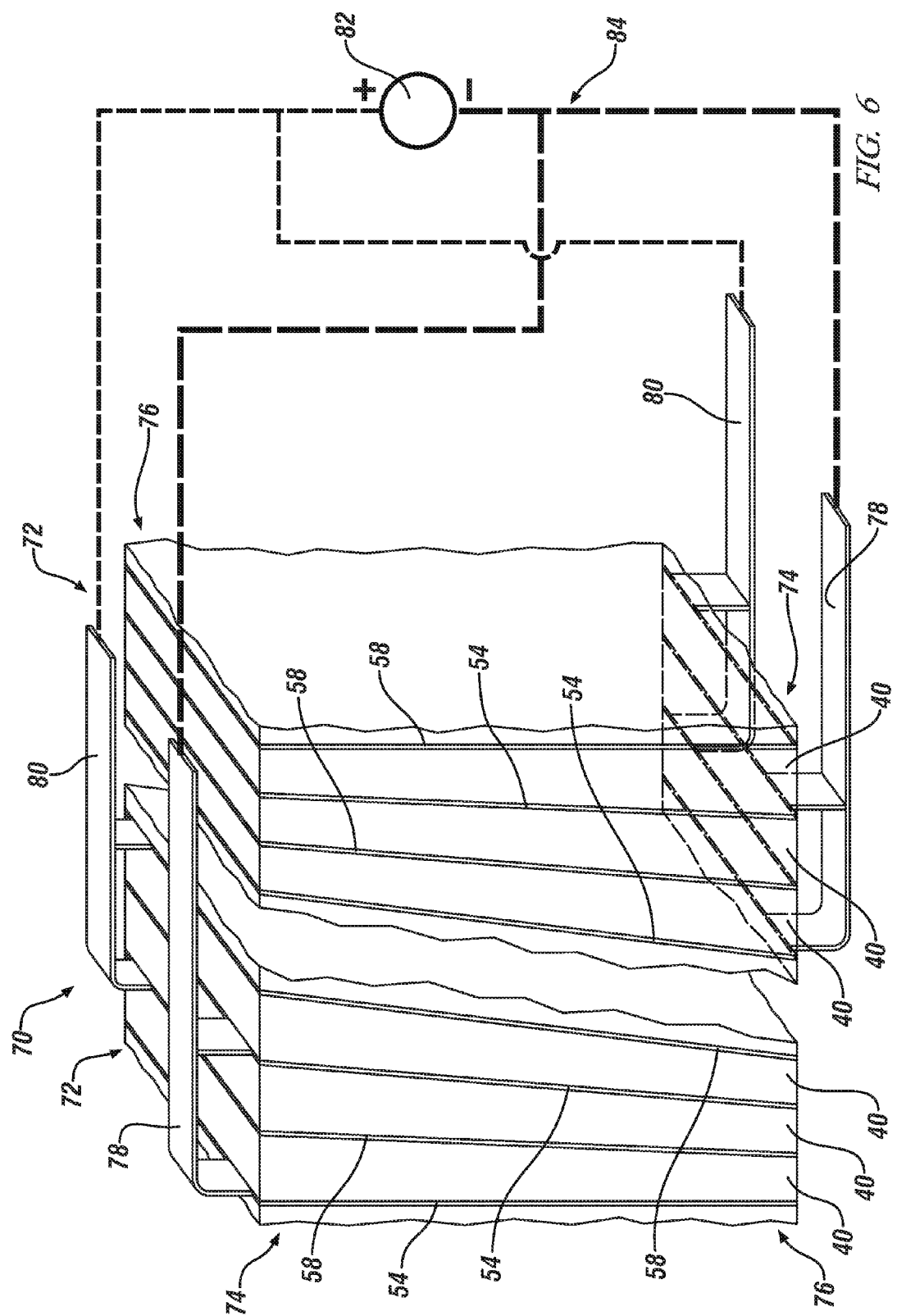
FIG. 6 is a generalized and schematic illustration of a lithium ion battery that includes several of the electrochemical battery cells depicted in FIG. 5.

A typical thickness of the electrochemical battery cell 40 extending between the metallic current collectors 54, 58 is about 70 μm to about 350 μm. Each electrode 42, 44 is preferably about 30 μm to 150 μm thick and, as already mentioned, the porous polymer separator layer 10 is about 10 μm to 50 μm thick at each of the first and second edges 12, 14 with the first edge 12 being at least 2% thicker than the second edge 14. The metallic current collectors 54, 58 are usually about 5 μm to 20 μm thick. The relatively thin and flexible nature of the electrochemical battery cell 40 and its associated metallic current collectors 54, 58 allows them to be rolled, folded, bent, or otherwise maneuvered into a variety of configurations depending on design specifications and spatial constraints. The electrochemical battery cell 40 can be configured, as shown in FIGS. 5 and 6, for modular side-by-side stacking with other similarly constructed electrochemical battery cells or, in another embodiment, it may be rolled into a wound cylindrical configuration with other cells.

The negative electrode 42 is preferably constructed from a lithium host material such as, for example, graphite, silicon, or lithium titanate. The lithium host material may be intermingled with a polymeric binder material to provide the negative electrode with structural integrity and, optionally, a conductive fine particle diluent. The lithium host material is preferably graphite and the polymeric binder material is preferably one or more of polyvinyldiene fluoride (PVdF), an ethylene propylene diene monomer (EPDM) rubber, styrene butadiene rubber (SBR), a carboxymethoxy cellulose (CMC), polyacrylic acid, or mixtures thereof. Graphite is normally used to make the negative electrode because, on top of being relatively inert, its layered structure exhibits favorable lithium intercalation and deintercalation characteristics which help provide the electrochemical battery cell with a suitable energy density. Commercial forms of graphite that may be used to construct the negative electrode are available from Timcal Graphite and Carbon (headquartered in Bodio, Switzerland), Lonza Group (headquartered in Basel, Switzerland), and Superior Graphite (headquartered in Chicago, Ill.). The conductive particle diluent may be very fine particles of, for example, high-surface area carbon black.

The positive electrode 44 is preferably constructed from a lithium-based active material that stores intercalated lithium at a higher electrochemical potential than the lithium host material used to make the negative electrode. The same polymeric binder materials (PVdF, EPDM, SBR, CMC, polyacrylic acid) and conductive fine particle diluent (high-surface area carbon black) that may be used to construct the negative electrode may also be intermingled with the lithium-based active material for the same purposes. The lithium-based active material is preferably a layered lithium transition metal oxide, such as lithium cobalt oxide ($LiCoO_2$), a spinel lithium transition metal oxide, such as spinel lithium manganese oxide ($LiMn_2O_4$), a lithium polyanion, such as a nickel-manganese-cobalt oxide [$Li(Ni_xMn_yCo_z)O_2$], lithium iron phosphate ($LiFePO_4$), or lithium fluorophosphate ($Li_2FePO_4F$). Some other suitable lithium-based active materials that may be employed include lithium nickel oxide ($LiNiO_2$), lithium aluminum manganese oxide ($Li_xAl_yMn_{1-}$ $rO_2$), and lithium vanadium oxide ($LiV_2O_5$), to name but a few alternatives. Mixtures that include one or more of these recited lithium-based active materials may also be used to make the positive electrode.

The porous polymer separator layer 10 functions as an electrically insulative mechanical barrier that physically separates the confronting inner face surfaces 46, 50 of the electrodes 42, 44 to prevent a short-circuit in the electrochemical battery cell 40. The porous polymer separator layer 10 is further infiltrated with a liquid electrolyte throughout its porosity that is able to communicate lithium ions. The liquid electrolyte, which also wets both electrodes 42, 44, is preferably a lithium salt dissolved in a non-aqueous solvent. Some suitable lithium salts that may be used to make the liquid electrolyte include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts. The non-aqueous solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes one or more of these solvents.

The porous polymer separator layer 10 is also oriented between the electrodes 42, 44 to help maintain a more uniform current density within the electrochemical battery cell 40. The orientation of the porous polymer separator layer 10 shown here locates the first edge 12 between the confronting inner face surfaces 46, 50 of the electrodes 42, 44 in a region of the cell 40 adjacent the projecting polarity tabs 56, 60 of the metallic current collectors 54, 58 and, furthermore, locates the second edge 14 between the confronting inner face surfaces 46, 50 of the electrodes 42, 44 in a region of the cell 40 more removed from the projecting polarity tabs 56, 60 than the first edge 12. Such positioning of the first and second edges 12, 14 of the porous polymer separator layer 10 compensates for the increased localized electrochemical activity that may occur in the cell 40 near the projecting polarity tabs 56, 60. This is because the lithium ions migrating between the electrodes 42, 44 have to travel a greater distance through the porous polymer separator layer 10 at the first edge 12 relative to the second edge 14. And making the lithium ions travel further through the porous polymer separator layer 10 in a region of the electrochemical battery cell 40 more prone to higher relative electrochemical activity helps make lithium ions more evenly available to the entire inner face surfaces 46, 50 of the electrodes 42, 44.

The electrochemical battery cell 40 may be connected to a plurality of other similarly constructed electrochemical battery cells 40 to produce a lithium ion battery 70 as shown in FIG. 6. Anywhere from five to fifty of the electrochemical battery cells 40 are typically connected in series (although a parallel connection is also permitted) to form a battery cell pack 72 that includes a thick end 74 and a thin end 76 in the stacking direction of the cells 10. The thick end 74 of the cell pack 72 is the end that includes alignment of the first edges 12 of the porous polymer separators 10 and, conversely, the thin end 76 of the cell pack 72 is the end that includes alignment of the second edges 14. Several of the battery cell packs 72 may be further connected in series or in parallel to provide the lithium ion battery 70 with the voltage and current capacity demanded for a particular vehicle application. A total of 20 to 150 electrochemical battery cells 40 are typically included in the lithium ion battery 70 if the battery 70 is intended to be used as an on-board a power source for a HEV or an EREV. To maintain an overall rectangular shape of the lithium ion battery 70, moreover, a pair of adjacent battery cell packs 72 may be aligned with the thick end 74 of the cell pack 72 diametrically opposed to the thin end 76 of the other cell pack 72.

A negative terminal 78 and the positive terminal 80 of the lithium ion battery 70 may be connected to an electrical device 82 as part of an external circuit 84 established between the negative electrodes 42 and the positive electrodes 44 of the several electrochemical battery cells 40. The electrical device 82 may be a wide variety of electrical loads and power-generating devices. An electrical load is a power-consuming device that is powered fully or partially by the lithium ion battery 70. Conversely, a power-generating device is one that charges or re-powers the lithium ion battery 70 through an applied external voltage. The electrical load and the power-generating device can be the same device in some instances. For example, the electrical device 82 may be an electric motor for a HEV or an EREV that is designed to draw an electric current from the lithium ion battery 70 during acceleration and provide a regenerative electric current to the lithium ion battery 70 during deceleration. The electrical load and the power-generating device can also be different devices. For example, the electrical load may be an electric motor for a HEV or an EREV and the power-generating device may be an AC wall outlet, an internal combustion engine, and/or a vehicle alternator.

The lithium ion battery 70 can provide a useful electrical current to the electrical device 82 by way of reversible electrochemical reactions that occur in the electrochemical battery cells 40 when the external circuit 84 is closed to connect the negative terminal 78 and the positive terminal 80 at a time when the negative electrodes 42 contain intercalated lithium (i.e., battery discharge). The electrochemical potential difference between the negative electrode 42 and the positive electrode 44 in each cell 40—approximately 2.5 to 4.3V—drives the oxidation of intercalated lithium contained in the negative electrodes 42. Free electrons produced by this oxidation reaction are collected by the negative-side current collectors 54 and are supplied to the negative terminal 78. A flow of free electrons is harnessed and directed through the electrical device 82 from the negative terminal 78 to the positive terminal 80 and eventually to the positive electrodes 44 by way of the positive-side current collectors 58. Lithium ions, which are also produced at the negative electrodes 42, are concurrently carried through the porous polymer separator layers 10 by the liquid electrolyte in route to the positive electrodes 44 as well. The flow of free electrons through the electrical device 82 from the negative terminal 78 to the positive terminal 80 can be continuously or intermittently provided until the negative electrodes 42 are depleted of intercalated lithium or the capacity of the electrochemical battery cells 40 is otherwise spent.

The lithium ion battery 70 can be charged or re-powered at any time by applying an external voltage to the electrochemical battery cells 40 to reverse the electrochemical reactions that occur during discharge. The applied external voltage compels the otherwise non-spontaneous oxidation of intercalated lithium contained in the positive electrodes 44 to produce free electrons and lithium ions. The free electrons are collected by the positive-side current collectors 58 and are supplied to the positive terminal 80. A flow of the free electrons is directed to the negative terminal 78 and eventually to the negative electrodes 42 by way of the negative-side current collectors 54. The lithium ions are concurrently carried back through the porous polymer separator layers 10 by the liquid electrolyte towards the negative electrodes 42 as well. The lithium ions and the free electrons eventually reunite and replenish the negative electrodes 42 with intercalated lithium to prepare the electrochemical battery cells 40 for another discharge phase. The external voltage may originate from the electrical device 82 as previously mentioned or by some other suitable mechanism.

While the lithium ion battery 70 shown in FIG. 6 includes several battery cell packs 72 arranged with diametrically opposed thick and thin ends 74, 76—with each of the cell packs 72 including several modularly-stacked electrochemical battery cells 40—it should be understood the illustrated lithium ion battery 70 is a schematic representation of only one possible configuration. FIG. 6 is not intended to inform the relative sizes of the electrochemical battery cells' components or to limit the wide variety of structural configurations the lithium ion battery 70 may assume. Various structural modifications to the lithium ion battery 70 shown in FIG. 6 are possible, despite what is explicitly illustrated, as is well understood by skilled artisans. For example, the battery cell packs 72 could just as easily be arranged with their thick ends 74 adjacent to one another and their thin ends 76 adjacent to one another such that the lithium ion battery assumes a donut-shaped configuration instead of the rectangular configuration shown in FIG. 6.

The above description of preferred exemplary embodiments is merely descriptive in nature and not intended to limit the scope of the claims that follow. Each of the terms used in the appended claims should be given its ordinary and customary meaning unless specifically and unambiguously stated otherwise in the specification.

The invention claimed is:

1. A method of making and using a porous polymer separator layer that may function as all or part of a separator for use in an electrochemical battery cell of a secondary liquid-electrolyte battery, the method comprising:
   (a) providing a polymer composition that includes a polyolefin;
   (b) forming a film having a cross-section with a non-uniform thickness from the polymer composition; and
   (c) deriving a porous polymer separator layer from the film, the porous polymer separator layer having a cross-section that comprises a first edge and a second edge opposite the first edge, each of the first and second edges of the cross-section having a height that defines a thickness of the porous polymer separator layer at the first and second edges, respectively, and wherein the height of the first edge is greater than the height of the second edge such that the porous polymer separator layer has a thickness at the cross-section that decreases from the first edge to the second edge, the porous polymer separator layer further having a porosity in the range of about 30% to about 90% that is distributed evenly throughout the separator layer.

2. The method of claim 1, wherein the height of the first edge of the porous polymer separator layer is at least 2% greater than the height of the second edge of the porous polymer separator layer.

3. The method of claim 1, wherein the heights of each of the first and second edges of the porous polymer separator layer range from about 10 μm to about 50 μm.

4. The method of claim 1, wherein step (b) comprises heating the polymer composition to form a melt of the polyolefin during formation of the film, and wherein step (c) comprises (c1) annealing the film and (c2) uniaxially stretching the film.

5. The method of claim 4, wherein the polymer composition comprises about 20 wt. % to about 100 wt. % of the polyolefin.

6. The method of claim 4, wherein the polymer composition further comprises particles having a higher melting temperature than the polyolefin, and wherein the particles become dispersed within the melt of the polyolefin during formation of the film.

7. The method of claim 1, wherein the polymer composition comprises the polyolefin and a plasticizer, wherein step (b) comprises heating the polymer composition to form a mixture of a melt of the polyolefin and the plasticizer during formation of the film, and wherein step (c) comprises (c1) biaxially stretching the film and (c2) extracting the plasticizer from the film.

8. The method of claim 7, wherein the polymer composition comprises about 20 wt. % to about 95 wt. % of the polyolefin, and about 5 wt. % to about 70 wt. % of the plasticizer based on a weight of the polyolefin and the plasticizer.

9. The method of claim 7, wherein the polymer composition further comprises particles having a higher melting temperature than the polyolefin, and wherein the particles become dispersed within the mixture of the melt of the polyolefin and the plasticizer during formation of the film.

10. The method of claim 7, wherein the plasticizer is an organic liquid that can be absorbed into the polyolefin and, once absorbed, lowers the glass transition temperature of the polyolefin.

11. The method of claim 10, wherein the plasticizer is mineral oil.

12. The method of claim 10, wherein the plasticizer is paraffin oil.

13. The method of claim 1 further comprising:
   (d) disposing the porous polymer separator layer between a negative electrode and a positive electrode to assemble an electrochemical battery cell of a secondary liquid-electrolyte battery.

14. The method of claim 13, wherein the secondary liquid-electrolyte battery is a lithium ion battery.

15. The method of claim 1, wherein step (a) comprises:
   extruding the film along an extrusion direction such that a width of the film oriented transverse to the extrusion direction is defined by the cross-section that includes the first and second edges of the film.

16. An electrochemical battery cell of a lithium ion battery that includes a negative electrode, a positive electrode, and a porous polymer separator layer disposed between the negative electrode and the positive electrode, the porous polymer separator layer functioning to electrically insulate the negative and positive electrodes yet communicate lithium ions between the electrodes when infiltrated with a liquid electrolyte, and wherein the porous polymer separator layer is formed according to the method of claim 1.

17. A method of making and using a porous polymer separator layer that may function as all or part of a separator for use in an electrochemical battery cell of a lithium ion battery, the method comprising:
   (a) extruding a film from a polymer composition that comprises a polyolefin, the film having a cross section including a first edge and second edge opposite the first edge, each of the first and second edges having a height that defines a thickness of the film at the first and second edges, respectively, and wherein the height of the first edge is greater than the height of the second edge such that the film has a thickness at the cross-section that decreases from the first edge to the second edge; and (b) deriving a porous polymer separator layer from the film, the porous polymer separator layer having a cross-section that comprises a first edge derived from the first edge of the film, a second edge derived from the second edge of the film, the first and second edges of the porous polymer separator layer having a similar height relationship as the first and second edges of the film, and opposed first and second faces that extend between the first and second edges of the porous polymer separator layer, the porous polymer separator layer further having a porosity distributed throughout the separator layer such that, when the separator layer is infiltrated with a liquid electrolyte, lithium ions can be communicated through the thickness of the separator layer coextensively between the first and second opposed faces.

18. The method of claim 17, wherein the height of the first edge of the porous polymer separator layer is at least 2% greater than the height of the second edge.

19. The method of claim 17, wherein the porosity of the porous polymer separator is distributed evenly throughout the separator layer and ranges from about 30% to about 90%.

20. The method of claim 17, further comprising:
(c) disposing the porous polymer separator layer between a negative electrode and a positive electrode to assemble an electrochemical battery cell of a lithium ion battery; and
(d) infiltrating the porous polymer separator layer with a liquid electrolyte.

* * * * *